US011336921B2

(12) United States Patent
Chandrashekar et al.

(10) Patent No.: US 11,336,921 B2
(45) Date of Patent: *May 17, 2022

(54) ACCELERATION OF CONTEXT ADAPTIVE BINARY ARITHMETIC CODING (CABAC) IN VIDEO CODECS

(71) Applicant: ARRIS Enterprises LLC, Suwanee, GA (US)

(72) Inventors: Padmassri Chandrashekar, Bangalore (IN); Padmagowri Pichumani, Bangalore (IN); Vinay Kulkarni, Bangalore (IN); Shailesh Ramamurthy, Bengaluru (IN); Anil Kumar Nellore, Bangalore (IN); Chetan Kumar Viswanath Gubbi, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/103,024

(22) Filed: Nov. 24, 2020

(65) Prior Publication Data
US 2021/0084342 A1 Mar. 18, 2021

Related U.S. Application Data

(63) Continuation of application No. 14/723,786, filed on May 28, 2015, now Pat. No. 10,848,786.
(Continued)

(51) Int. Cl.
H04N 19/91 (2014.01)
H04N 19/70 (2014.01)
H04N 19/13 (2014.01)

(52) U.S. Cl.
CPC ............ H04N 19/91 (2014.11); H04N 19/13 (2014.11); H04N 19/70 (2014.11)

(58) Field of Classification Search
USPC ..................................... 375/240.03
See application file for complete search history.

(56) References Cited

U.S. PATENT DOCUMENTS 10,848,786 B2 * 11/2020 Chandrashekar ...... H04N 19/91
2005/0123207 A1 6/2005 Marpe et al.
(Continued)

FOREIGN PATENT DOCUMENTS

WO 2013/063982 A1 5/2013

OTHER PUBLICATIONS

Tian et al, 2008 (X. H. Tian, T. M. Le, X. Jiang and Y. Lian, "Implementation Strategies for Statistical Codec Designs in H.264/AVC Standard," 2008 The 19th IEEE/IFIP International Symposium on Rapid System Prototyping, 2008, pp. 151-157, doi: 10.1109/RSP.2008.22). (Year: 2008).*
Chen et al, 2010(J. Chen, L. Wu, P. Liu and Y. Lin, "A high-throughput fully hardwired CABAC encoder for QFHD H.264/AVC main profile video," in IEEE Transactions on Consumer Electronics, vol. 56, No. 4, pp. 2529-2536, Nov. 2010, doi: 10.1109/TCE.2010.5681137). (Year: 2010).*
(Continued)

Primary Examiner — Christopher S Kelley
Assistant Examiner — Ana Picon-Feliciano
(74) Attorney, Agent, or Firm — Chernoff, Vilhauer, McClung & Stenzel, LLP

(57) ABSTRACT

A method is provided for determining a context-index when performing Context-based Adaptive Binary Arithmetic Coding (CABAC) for video compression or decompression includes initializing to an initialized value each of a plurality of context-indexes of chosen syntax elements associated with a given block (e.g., a macroblock). The context-index of dependent neighboring blocks of the given block is evaluated. The dependent neighboring blocks are blocks that have a context-index that depends on coding of a current bin position. The context-index of the dependent neighboring (Continued)

blocks is updated if and only if their context-index changes from the initialized values.

19 Claims, 8 Drawing Sheets

Related U.S. Application Data

(60) Provisional application No. 62/003,711, filed on May 28, 2014.

(56) References Cited

U.S. PATENT DOCUMENTS

| | | |
|---|---|---|
| 2009/0141804 A1 | 6/2009 | Zhao et al. |
| 2009/0245349 A1 | 10/2009 | Zhao et al. |
| 2011/0004881 A1 | 1/2011 | Terechko et al. |
| 2013/0101035 A1 | 4/2013 | Wang et al. |
| 2013/0114675 A1 | 5/2013 | Guo et al. |
| 2013/0202051 A1 | 8/2013 | Zhou |
| 2013/0272389 A1 | 10/2013 | Sze et al. |
| 2014/0140400 A1 | 5/2014 | George et al. |
| 2014/0355690 A1 | 12/2014 | Choi et al. |
| 2015/0092834 A1 | 4/2015 | Cote et al. |

OTHER PUBLICATIONS

Adiono et al, 2009(T. Adiono, A. Maria. K and A. Hamidah S, "VLSI architecture design for Inverse-CABAC on H.264 Decoder," 2009 International Conference on Electrical Engineering and Informatics, 2009, pp. 650-653, doi: 10.1109/ICEEI.2009.5254737). (Year: 2009).*

PCT Invitation to Pay Additional Fees (Form 206), RE: Application No. PCT/US2015/032835, dated Aug. 12, 2015.

D. Marpe, et al., "Context-based adaptive binary arithmetic coding in the H.264/AVC video compression standard", IEEE Transactions on Circuits and Systems for Video Technology, vol. 13, No. 7, Jul. 1, 2003, pp. 620-636.

W. Xia, et al., "Implementation strategies for CABAC decoder of H.264 for HD resolution video", Computer Engineering and Technology (ICCET), 2010 IEEE 2nd International Conference, Apr. 16, 2010, pp. V2-596.

V. Sze, et al., "High Throughput CABAC Entropy Coding in HEVC", IEEE Transactions on Circuits and Systems for Video Technology, IEEE Service Center, vol. 22, No. 12, Dec. 1, 2012.

PCT Search Report & Written Opinion, RE: Application No. PCT/US2015/032832, dated Oct. 20, 2015.

\* cited by examiner

ACCELERATION OF CONTEXT ADAPTIVE BINARY ARITHMETIC CODING (CABAC) IN VIDEO CODECS

CROSS REFERENCE TO RELATED APPLICATION

This Application is a continuation of U.S. patent application Ser. No. 14/723,786 filed May 28, 2015, now U.S. Pat. No. 10,848,786, which claims priority under 35 U.S.C. § 119(e) from earlier filed U.S. Provisional Application Ser. No. 62/003,695, filed May 28, 2014, the contents of each of which are incorporated herein by reference in their entirety.

BACKGROUND

Context Adaptive Binary Arithmetic Coding (CABAC) is an entropy coding method used in video standards such as H.264 and HEVC. This is the last stage of the video encoding process where a lossless coding technique is applied to the various syntax elements. CABAC is based on binary arithmetic coding. It uses multiple probability models for different syntax elements and adaptively selects the probability model during coding. This is a more efficient technique than CAVLC, which was used in earlier standards and in the baseline profile of H.264. However it is also highly complex and sequential, and hence forms one of most CPU intensive module in the decoder. CABAC decoding is also sequential in nature and hence exploiting the capabilities of multi-core processors is also difficult.

With increasing resolutions being supported on smaller devices such as smartphones and the like, optimization for real time decoding and encoding is becoming more important. CABAC decoding turns out to be the bottleneck in many decoders that are implemented on multi-core platforms.

SUMMARY

In accordance with one aspect of the subject matter disclosed herein, a method is provided for determining a context-index when performing Context-based Adaptive Binary Arithmetic Coding (CABAC) for video compression or decompression. In accordance with the method, each of a plurality of context-indexes of chosen syntax elements associated with a given macroblock (MB) are initialized to an initialized value. The context-index of dependent neighboring MBs of the given MB is evaluated. The dependent neighboring MBs are MBs that have a context-index that depends on coding of a current bin position. The context-index of the dependent neighboring MBs is updated if and only if their context-index changes from the initialized values.

In accordance with another aspect of the subject matter disclosed herein, a method is provided for debinarizing Context-based Adaptive Binary Arithmetic Coding (CABAC) data during video decompression. In accordance with the method, all syntax elements which are coded with a specific bit pattern and bit length that is pre-defined by a protocol are identified. The codes of the syntax elements that are identified are arranged such that the codes with an equal number of bits are arranged sequentially without any intervening codes having a different number of bits. De-binarization is performed using the arranged codes of the syntax elements.

In accordance with yet another aspect of the subject matter disclosed herein, a CABAC encoder is provided. The CABAC encoder includes a binarization module, a context-index module and an arithmetic encoder. The binarization module converts a syntax element into a sequence of bins. The context-index module obtains one or more context models for the syntax element based on the sequence of bins. Each of the context models is associated with a context model. The context-index module obtains the one or more context models by initializing a context-index of the syntax element associated with a given macroblock (MB) and evaluates the context-index of dependent neighboring MBs of the given MB. The dependent neighboring MBs are MBs that have a context-index that depends on coding of a current bin position. The arithmetic encoder updates the one or more context models based on the sequence of bins and uses the one or more context models to encode each of the bins in the sequence The arithmetic encoder updates the one or more context models by updating the associated context-indices of the dependent neighboring MBs if and only if their context-indices changes from the initialized values.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

H.264/HEVC Video Encoder Overview

Figure 1:
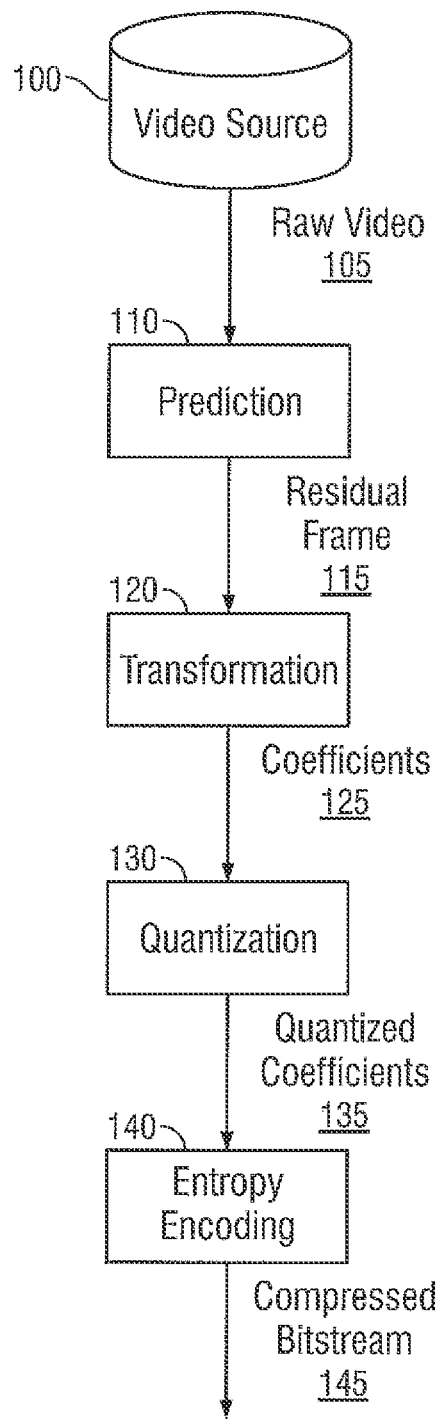
FIG. 1 is a high-level flow chart illustrating one example of a method of encoding video data using an implementation of an H.264 video encoder.

FIG. 1 is a high-level flow chart illustrating a method of encoding video data using an implementation of an H.264 video encoder according to one embodiment. Generally, an H.264/HEVC encoder receives raw video data 105 from a video source module 100 and performs the steps of prediction 110, transformation 120, quantization 130, and entropy encoding 140. The video source module 100 may comprise a computer hard drive, computer memory, flash memory card, or any other means of storing digital video data. The video source module 100 may be local to the H.264 video encoder, or may be external and accessible over a network. The modules performing prediction 110, transformation 120, quantization 130 and entropy encoding 140 as well as the video source 100 may be implemented in a single module or device, or may be implemented in multiple modules or devices. In addition, the functionalities of these modules may be implemented in fewer or additional modules than the ones shown in FIG. 1. Additional functionalities not shown may also be implemented in an H.264 encoder.

Raw video data 105 is transmitted from the video source 100 to a prediction module 110. Raw video data 105 may be video data is any format, whether uncompressed, previously compressed, or otherwise. The raw video data 105 may comprise information describing the video's general display characteristics (such as the video's size, length, resolution, or screen proportions), information describing the video's frame-specific display characteristics (such as pixel color information, pixel location information, brightness, opacity, block and macroblock dimensions and frame location, or any other pixel-domain information), or meta-data describing the video (such as the video title, publisher, publishing date, or keywords describing categorical characterizations of the video content). Raw video data 105 may be in frame format, comprising one or more plurality of still images each composed of pixel information, which when displayed consecutively form motion video.

Prediction module 110 receives one or more frames of raw video data 105 and produces one or more residual frames 115. The process of prediction typically comprises receiving an input frame of video, determining a prediction image similar to the input frame of video, and subtracting the prediction image from the input frame of video to produce a residual frame of video. The residual frame of video typically comprises less data than the input frame of video and thus is easier to encode and compress. Subtracting a prediction image from an input image typically comprises subtracting the pixel information of the prediction image from the pixel information of the input image, resulting in a residual image composed of pixel information representing the difference of the subtraction. Either the received input frame or the produced residual frame 115 may be comprised of macroblocks, which in one embodiment may comprise 16-by-16 squares of pixels.

Prediction module 110 may utilize spatial prediction (identifying objects, shapes, curves, lines, or any other characteristic of a single image similar to a prediction image), temporal prediction (identifying characteristics of precedent or subsequent frames, such as the motion of an object), or any other suitable method to determine a prediction image for a raw video data 105 image. The prediction image may come from a dictionary or library of reference images available to both the encoder and decoder. Alternatively, the prediction image may come from a previously encoded frame, or a frame which will be encoded in the future. Each prediction image may be comprised of one or more than one prediction sub-images. For instance, prediction module 100 may determine a first prediction image for the background of an input image and a second prediction image for an object in the foreground of the input image. The term "prediction image" thus may encompass the combination of all prediction sub-images into a single image. Prediction module 100 then subtracts the prediction image from the raw video data 105 image and outputs residual frame 115.

Transformation module 120 receives residual image 115 in pixel form, processes the residual image 115 and outputs residual image coefficients 125 (the residual image in the transform domain). Transformation module 120 may apply a discrete cosine transform (DCT), a wavelet transform, or any other Fourier-related transform to the received residual image 115. In one embodiment, transformation module 120 processes one macroblock of residual frame at a time, producing one set of coefficients for each processed macroblock. In embodiment, one coefficient is produced for each pixel of residual image 115.

Quantization module 130 receives coefficients 125, quantizes the coefficients 125 and outputs quantized coefficients 135. The quantization of coefficients 125 typically results in many higher frequency coefficients being rounded to zero, reducing the storage space required to maintain the coefficients. Quantization module 130 may compress the range of received coefficients 125 to a single quantum value to produce quantized coefficients 135. In one embodiment, quantization module 130 divides the received coefficients by a selected quantization matrix, and the resulting quotients are rounded to the nearest integer to produced quantized coefficients 135.

Entropy encoding module 140 receives quantized coefficients 135, compresses the coefficients, and outputs compressed bitstream 145. Entropy encoding module 140 utilizes a lossless compression method, such as CAVLC or CABAC. Entropy encoding module 140 may perform incremental encoding, outputting one or more bits at a time as the received quantized coefficients 135 are being compressed. In addition to compressing received quantized coefficients 135, entropy encoding module 140 may compress any syntax element. Syntax elements comprise (in addition to quantized coefficients 135), information which enables a decoder to re-create the prediction, information about the structure of the compressed data, information about the encoded video sequence, information about the compression tools used during encoding, or any other information which describes the video or the encoding and compression process. The compressed bitstream 145 may be transmitted to a decoder for decoding and playback.

H.264 CABAC Encoder Overview

Context-adaptive binary arithmetic coding (CABAC) is a form of entropy encoding used in H.264/MPEG-4 AVC and HEVC video Standard. It is capable of lossless compression in itself. CABAC based coding is adaptive in that the CABAC adapts the contexts upon coding symbols, where the context identifies the set of symbols coded in the past and used for adaptation. The past symbols may be located in adjacent blocks and also may refer to symbol values of neighboring blocks.

CABAC encoding may be conceptualized as operating in accordance with three primary steps: binarization, context modeling and binary arithmetic coding. The first step, binarization, maps input symbols to "bins" or a string of binary symbols. The input symbol could be a non-binary valued symbol that is binarized. In context modeling, a model probability distribution is assigned to a given bin. The probability model depends on 'context', which is a function of local and pre-observed statistics; the local statistics corresponds to coded bins in the past. The binary arithmetic encoder uses this context model for encoding the bin. Based on the actual encoded bin value the context model is updated thus making it adaptive. The context models are indexed using a context-index. Finally, in binary arithmetic coding, the encoding of the bins is performed using either a 'regular coding method' or a 'bypass coding method'. The bins can be coded into bits (of the coded bit-stream) using either a 'regular coding method' or 'bypass coding method'. In the 'regular coding method', a probability model needs to be selected and used for arithmetic coding bin(s) corresponding to input symbols.

The above steps were described from the perspective of CABAC operating in a video encoder or compressor. In a video decoder or de-compressor, CABAC decoding reverses some of the processing methods used by an encoder. The bits (of a coded bit-stream) are converted into bins, using either the 'regular decoding method' or 'bypass decoding method' based on which method the encoder used to code the bit(s). The processing involved in 'regular decoding method' or 'bypass decoding method' and de-binarization at the decoder are inverse processes of the corresponding methods used by an encoder. The processing involved in context model selection and context model updating remains the same as in encoder. The de-binarization step in CABAC converts the bins to the transmitted symbol value. The symbol is used for the remaining processes involved in the video decoding.

Figure 2:
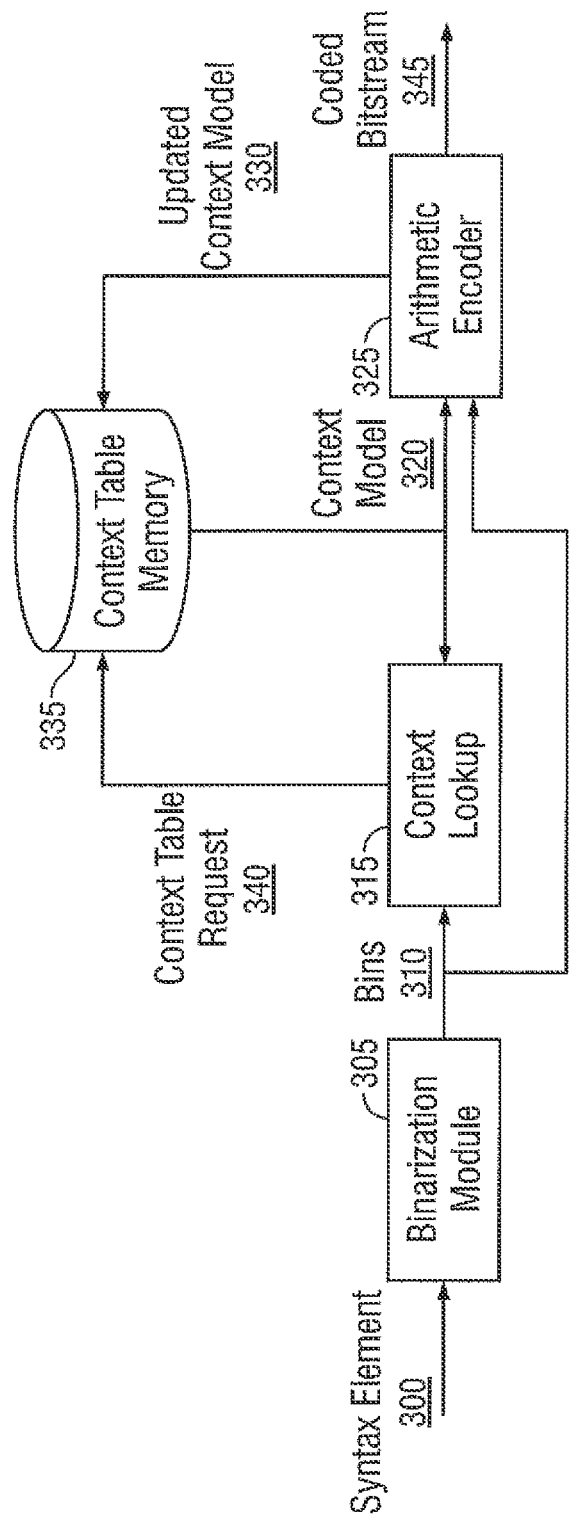
FIG. 2 is a high-level block diagram illustrating one example of an H.264 CABAC encoder.

The CABAC process described above at the conceptual level will be described in more detail with reference to FIG. 2, which a high-level block diagram illustrating one example of an H.264 CABAC encoder. The CABAC encoder may be implemented by the entropy encoding module 140 in the H.264 video encoding process described in FIG. 1. The primary components of the exemplary CABAC encoder are the binarization module 305, the context lookup module 315, the arithmetic encoder module 325 and the context table memory 335. Additional or fewer modules may be used to implement CABAC encoding functionality. The CABAC encoder will be described in the context of a single encoding cycle for the purposes of clarity; multiple cycles of encoding may be performed by the CABAC encoding, such as in a pipelined implementation of the CABAC encoder.

The binarization module 305 receives a syntax element 300, performs binarization by converting the syntax element 300 into ordered binary bits, referred to as "bins" 310, and outputs the bins 310. In one embodiment, the syntax element 300 comprises a quantized coefficient, or any of the video information or encoding information discussed above. The syntax element 300 may additionally comprise a syntax element identifier ("syntax element ID") that identifies the syntax element. For instance, the syntax element ID may identify which macroblock a quantized coefficient syntax element 300 belongs to, which portion of the encoded video a quantized coefficient syntax element 300 appears in, or which type of quantization was performed in encoding a video. In one embodiment, the order of the bins of the binarized syntax element must be maintained. For example, the arithmetic encoder 325 may be required to encode the bins in the order that they are outputted by binarization module 305 in order for a decoder to decode the encoded binarized syntax element. Finally, the syntax element 300 may comprise a context model index, identifying a context model to be used in arithmetic encoding.

Bins 310 are individual binary bits representing a received syntax element 300 and may comprise a syntax element ID, identifying the syntax element each bin represents. Alternatively, each bin 310 may include a context model index which identifies a context model associated with each bin 310. The context index may be derived from the syntax element ID, or may be independently derived or received. The binarization module 305 transforms the received syntax element 300 into binary form. For instance, the syntax element 300 may be received in integer form, and the binarization module converts the syntax element 300 to binary bins 310.

Context lookup module 315 receives the bins 310 and transmits a context table request 340 to context table memory 335. The context table request 340 may identify the syntax element associated with a received bin 310. In one embodiment, a received bin 310 includes a syntax element ID, and the context lookup module 315 parses this syntax element ID and transmits it with the context table request 340. The context table request 340 may comprise a context model index which may identify a specific context model within context table memory 335, or a specific location within context table memory 335 containing a specific context model.

Context lookup module 315 may request a context model from context table memory 335 once for each syntax element, or may request the same context model multiple times for a given syntax element, such as once per received bin. For simplicity, the term "context model" may refer to a singular context model, multiple context models, or a context model word comprising multiple context models stored together.

Context table memory 335 receives the context table request 340 and outputs context model 320 based on the request 340. The context table memory 335 may comprise one or more memory locations and may contain one or more context models per memory location. For instance, each context table memory location may store a context model word comprising 32 context models. In one embodiment, context table memory 335 indexes context models by context model index. The context model index may comprise a memory location and a specific context model stored at that memory location. For example, in one exemplary embodiment, the context model index for context model "14" at memory address "E41C" is "E41C14".

By way of example, in the H.264 standard the context indices in the range from 0 to 72 are related to syntax elements of macroblock type, sub-macroblock type and prediction modes of spatial and of temporal type as well as slice-based and macroblock-based control information. For these types of syntax elements a corresponding context index can be calculated from the sum of a context index offset, which is defined as the lowest value in the range, and a context index increment of a given syntax element. Likewise, context indices in the range from 85-104 are related to the syntax element coded_block_flag, while the context indexes from 73-398 are related to the coding of residual data.

The stored context models may comprise a probability that a received bin will be a specific bit, and may comprise any form sufficient to allow arithmetic encoder 325 to encode bins 310. For instance, the stored context models may comprise 7-bit words made up of a 1-bit most probable bit (MPB) and a 6-bit binary probability that a received bin is identical to the MPB. Alternatively, the context models may instead comprise the least probable bit (LPB), the probability that a received bin is identical to the LPB, or any combination of an identified bit and a probability of receiving the identified bit or its inverse. In addition, the context models may be stored in more or fewer than 7 bits in context table memory 335, and probabilities may comprise more or fewer than 6 bits. In one embodiment, context table memory 335 stores an index for each context model and computes the probability component of a context model when that context model is requested.

The context table memory 335 accesses and outputs the requested context model 320 identified by context table request 340. The context model 320 may be transmitted to context lookup module 315 for subsequent transmission to arithmetic encoder 325, or may be transmitted directly to arithmetic encoder 325. Arithmetic encoder 325 receives a context model 320 and a bin 310, and produces an updated context model 330 and a coded bitstream 345. In some cases only one context model 320 is used to encode bins of the same syntax element; alternatively, more than one context model 320 may be used to encode the bins of a given syntax element.

The arithmetic encoder 325 adaptively updates context model 320 depending on the content of received bins 310. In some cases the arithmetic encoder 325 updates context model 320 each time a bin 310 is received. While encoding the received bins 310 of a syntax element, arithmetic encoder 325 may maintain updated context model 330 internally, using updated context model 330 to encode each subsequent bin of a syntax element, updating the context model after encoding each subsequent bin. The context models may be updated according to the probability state index transition rules defined in H.264, or may be updated using any suitable adaptive method.

The updated context model 330 may be transmitted to context table memory 335 each time the context model is updated, or after an entire syntax element is encoded. The context table memory 335 may write the updated context model 330 to the memory location of the original context model 320, overwriting the original context model 320.

Arithmetic encoder 325 uses context model 320 to encode each of received bins 310 based on bin value, type and the corresponding context model of the bin. Arithmetic encoder 325 may encode received bins 310 into a single fractional number n, where n is greater than or equal to 0 and less than 1. To encode received bins 310, encoder 325 may maintain a numerical interval representing the probability of receiving previously received bins 310. The numerical interval may be have an upper interval limit and a lower interval limit, and may be represented by range R, comprising the difference between the upper interval limit and the lower interval limit. In one embodiment, the numerical interval is initialized to the interval [0, 1] and is updated for each received bin 310. In one embodiment, the maintained interval has an upper interval limit, $R_U$, and lower interval limit, $R_L$, which are updated when encoding a received bin.

Optimization of Context Index Determination

One aspect of the subject matter described herein pertains to the reduction in the number of operations used in the calculation of context-indexes during CABAC processing. This aspect can be used by any video encoder or decoder that employs CABAC, examples of which are the H.264 or HEVC codecs. As detailed below, this reduction is accomplished by broadcasting the current context indexes to neighboring blocks.

Many syntax elements (SE) coded by CABAC require the selection of a context at every sample location in a picture based on the value of the syntax elements in the neighboring blocks. The neighboring blocks are usually the block to the top and the block to the left or the previous block previous in the decoding order.

One conventional technique employed in H.264 and HEVC for context determination, referred to herein as the direct method, requires access to multiple syntax elements of the neighboring macroblocks (MB) plus a variety of logical operations and conditional checks.

The present disclosure employs an alternate technique aimed at reducing the computation time for context determination. In accordance with this technique, the contexts corresponding to the downstream neighboring blocks (e.g., the next block in the coding order or the blocks to the bottom and right of the current block) are determined and broadcast as and when they change from an initialized value. The determination may be performed based on information already available concerning the current MB being processed. Thus, unlike the direct method, there is no need for storing and accessing the syntax element values of a specific MB that is needed for context determination by downstream neighboring blocks when they are to be CABAC processed in future.

The context determination techniques described herein may be applied when encoding and decoding the bins of a variety of syntax elements. For example, in H.264, illustrative syntax elements that depend on information from neighboring blocks and thus may benefit from this technique include mb_type, mb_skip_flag, transform_size_8×8_flag, mb_qp_delta, mb_field_decoding_flag, intra_chroma_pred_mode, mvd (horizontal)_l0, mvd (vertical)_l0, mvd (horizontal)_l1, mvd (vertical)_l1, ref_idx_l0, ref_idx_l1, coded_block_pattern and coded_block_flag. Likewise, in HEVC, illustrative syntax elements that may benefit from this technique include split_cu_flag, cu_skip_flag and sig_coeff_flag.

Figure 3:
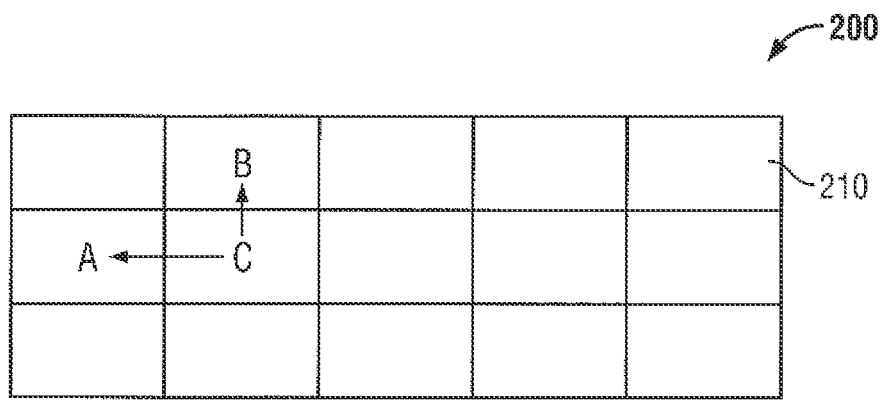
FIG. 3 shows a frame or picture that is divided into blocks such as macroblocks in H.264 and coded tree blocks in HEVC.

The conventional direct method for context determination will be illustrated with reference to FIG. 3, which shows a frame or picture 200 that is divided into blocks 210 (e.g., macroblocks in H.264 and coded tree blocks (CTBs) in HEVC). As shown, blocks C, B and A represents the current block, top neighboring block and left neighboring block, respectively. To calculate the context index in C, syntax element values from neighboring blocks A and B are read and evaluated using certain conditions.

Figure 4:
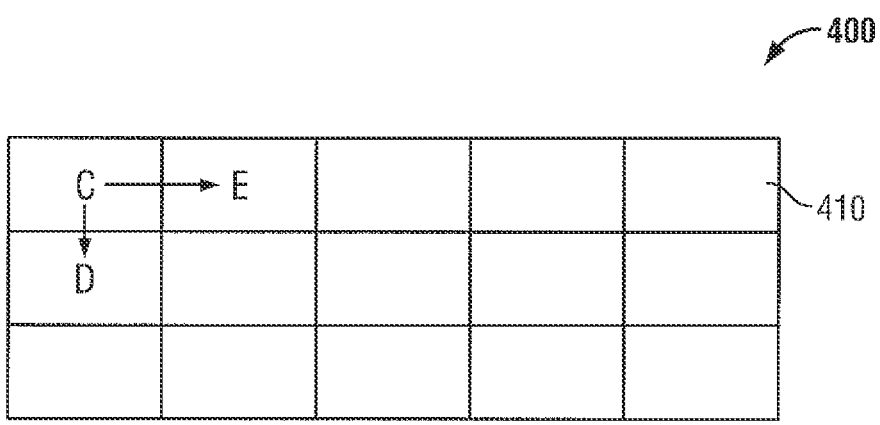
FIG. 4 shows another frame or picture that is divided into blocks such as macroblocks in H.264 and coded tree blocks in HEVC.

The broadcasting method for context determination in accordance with subject matter disclosed herein will be illustrated with reference to FIG. 4, which shows a frame or picture 400 that is divided into blocks 410 (e.g., macroblocks in H.264 and coded tree blocks (CTBs) in HEVC). As shown, blocks C, D and E represent the current block, the bottom neighboring block and the right neighboring block, respectively.

First, the bin in block C is decoded based on the context for the bin and block characteristics of block C. Next, the context index for the corresponding bin in neighboring blocks D and E are computed and updated if needed (depending on specific conditions that will be described below). The context index for decoding the corresponding bins in blocks D and E is now readily available. This eliminates the need for accessing the syntax element values from neighboring blocks.

In general, when using the broadcasting method, all contexts are initialized to a default value (which can be chosen as the context-index associated with the first context available for every set of context-indices for a syntax element) and updated as and when needed. For instance, for the syntax element CBP (luma), the lowest or first context index is 73. In one embodiment, two rows of context-indexes for the luma CBP bins of all the 8×8 blocks in the current and subsequent row of macroblocks in the picture may be initialized to this value.

Example—Coding the Bins of the Syntax Element Luma CBP

The following example for the syntax element luma coded block pattern (CBP) in H.264 will be used to illustrate the effectiveness of the broadcasting method for context determination relative to the direct method of context determination. This example will demonstrate that it is more effective to broadcast the effect of changes to the context index than to access the information from neighboring blocks at every context determination step.

In H.264, a coded block pattern (CBP) indicates which of the four 8×8 luma blocks and associated chroma blocks of a 16×16 MB may contain non-zero transform coefficients. The CBP is a six bit value (range 0 to 47) with the two MSBs indicating CBP values for chroma blocks and the remaining four least significant bits indicating CBP values for four 8×8 luma blocks (luma CBP). The luma CBP is coded for macroblocks (MBs) that are not PCM or Skip MBs. For Intra_16×16 MBs, the CBP is not coded explicitly, but is embedded as part of the mb_type syntax element. H.264 defines a set of 4 contexts that could be used for coding each bin of luma CBP. These contexts are indexed by using a context-index value. The context selection for coding each bin is determined based on the information from the 8×8 blocks neighboring (top and left) the current 8×8 block. The selected context and bin value at its position is used to generate a coded bit at the encoder. The selected context and encoded bit is used to get back the bin value at decoder. The coded value is further used to update the context.

First, with reference once again to FIG. 3, the conventional direct method of context determination will be described for the syntax element "luma coded block pattern." As previously mentioned, I blocks 'C', 'A' and 'B' represent the current block, left neighbor block and top neighbor block, respectively. For coding the CBP bin corresponding to block C, the context needs to be selected. The context selection is based on the syntax element values from blocks A and B.

The following steps are performed to derive the context-index using the direct method. First in step 1, the context-index is initialized to the Context-Index-Offset (i.e., 73). Next, in step 2 if the current MB is a PCM or a Skip or Intra 16×16, do not code the CBP and go to step 9 discussed below. (If the current MB is Intra_16×16 MBs, the CBP is not coded explicitly, but is embedded as part of the mb_type syntax element). The syntax element values mb_type and the corresponding luma CBP bin are read from the neighbors A (left neighbor) or B (top neighbor) in step 3. If neighbors A or B are to be obtained from the neighboring MB, the following conditions are checked in step 4:
  a. check if mb_type==I_PCM, if true, go to step 6, discussed below;
  b. check if mb_type !=P_SKIP and mb_type !=B_SKIP and if CBP bin from neighbor !=0, go to step 6, discussed below;
  c. increment the context-index by 1 if left neighbor and by 2 if top neighbor,
  Else (A or B belongs to the current MB). If the prior coded bin of the CBP for the corresponding neighbor is equal to 0, increment the context-index by 1 if it is left neighbor and by 2 if it is the top neighbor, else continue with following steps.

In step 5, step 3 is repeated for the second neighbor (A or B). In step 6, the bin is coded using the context associated with the updated context-index and stored in step 7. In step 8, the process is then repeated from step for all the remaining luma CBP bins. Finally, in step 9, the next syntax element is coded.

The computational needs for determining the context index for coding each bin using the above steps for the conventional direct coding process will now be determined for each of three different cases that involve different categories of neighboring blocks. For each case the number of conditional checks, memory read and write operations required will be determined.

In case 1, the neighboring blocks are assumed to be from different MBs. Four read operations (mb_type and CBP of two neighbors) are required, as indicated in step 3 above. Also, up to 10 conditional checks are required, 8 for the mb_type and 2 for the CBP, as indicated in step 4 above. Finally, 1 write operation of the coded bin is required, as indicated in step 7 above.

In case 2, one neighboring block is assumed to belong to the current MB and the other neighboring block is assumed to belong to a different MB. Three read operations (mb_type and CBP of one neighbor and only CBP of the other neighbor) are performed, as indicated in step 3 above. Additionally, up to 6 conditional checks, 4 for the mb_type and 2 for the CBP, are performed, as indicated in step 4 above. Finally, 1 write operation of coded bin is performed, as indicated in step 7 above.

In case 3, both neighboring blocks are assumed to belong to the current MB. Two read operations (the CBP bin of two neighbors) are performed, as indicated in step 3 above. Up to two conditional checks are performed for the CBP, as indicated in step 4 above. Finally, 1 write operation of the coded bin is performed, as indicated in step 7 above.

The average values over all three cases for the read, check and write operations for determining the context index for each bin is 3 reads, 6 checks and 1 write. This average is obtained based on the deterministic knowledge that out of four 8×8 blocks in an MB, one block will likely have both its neighbors in different MB, two blocks will likely have one of their neighbors in different MBs and one block will likely have both its neighbors in the same MB.

The above computational data may be extrapolated to a frame of 1080p content, with 32,400 8×8 blocks for each frame. In this case 25% of the blocks (8,100 blocks) will have both neighbors in different MBs, 50% of the blocks (16,200 blocks) will have one neighbor in different MBs and 25% of the blocks (8,100 blocks) will have both neighbors in the same MB. Thus, for coding 32,400 bins of luma CBP the number of computations needed for determining the context index will be 97,200 read operations, 1,094,400 check operations and 32,400 write operations.

Next, with reference once again to FIG. 4, the broadcasting method for context determination in accordance with the subject matter disclosed herein will be described once again for the syntax element "luma coded block pattern." As previously mentioned, the blocks C, D and E represent the current block, the bottom neighbor block and the right neighbor block, respectively. The following steps are performed to derive the context-index using the broadcasting method.

As a preliminary matter, an initialization step is performed whereby the luma CBP context-indices for all blocks are initialized to the syntax element luma CBP's lowest or first context-index, which is 73. In one embodiment, two rows of context-indices for the luma CBP bins of all the macroblocks in the current and subsequent rows of the picture are initialized. The luma CBP bin of block C is coded using the initialized or updated value of the context index. Based on the coded bin values and the characteristics of block C, the context index of the corresponding bin in neighboring blocks D and E are updated if they are different from the initialized value.

Figure 5A:
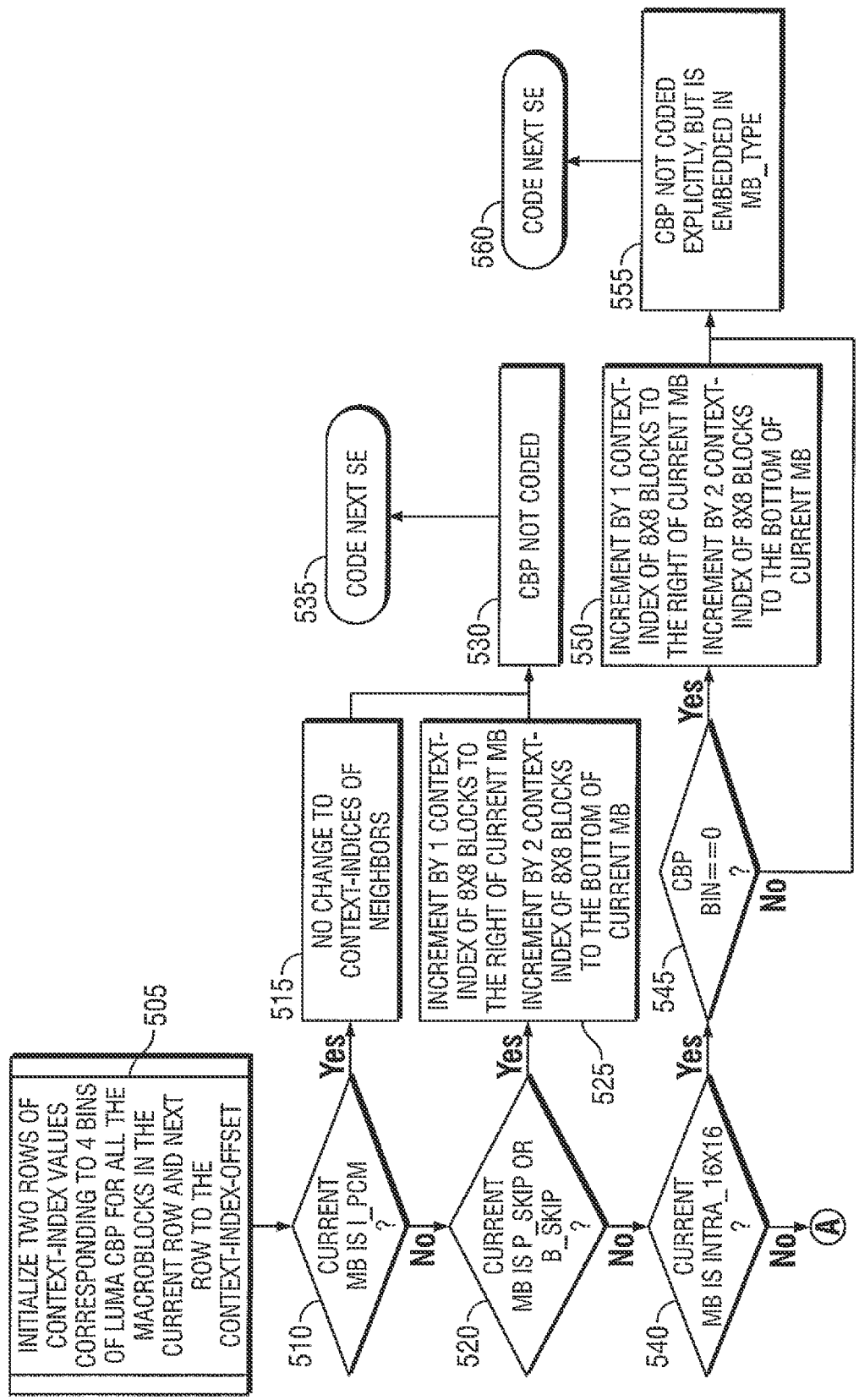
FIG. 5, which is broken into parts FIG. 5A and FIG. 5B, provides a flowchart showing one example of the steps involved in the derivation of the context-indices using a broadcasting method.
Figure 5B:
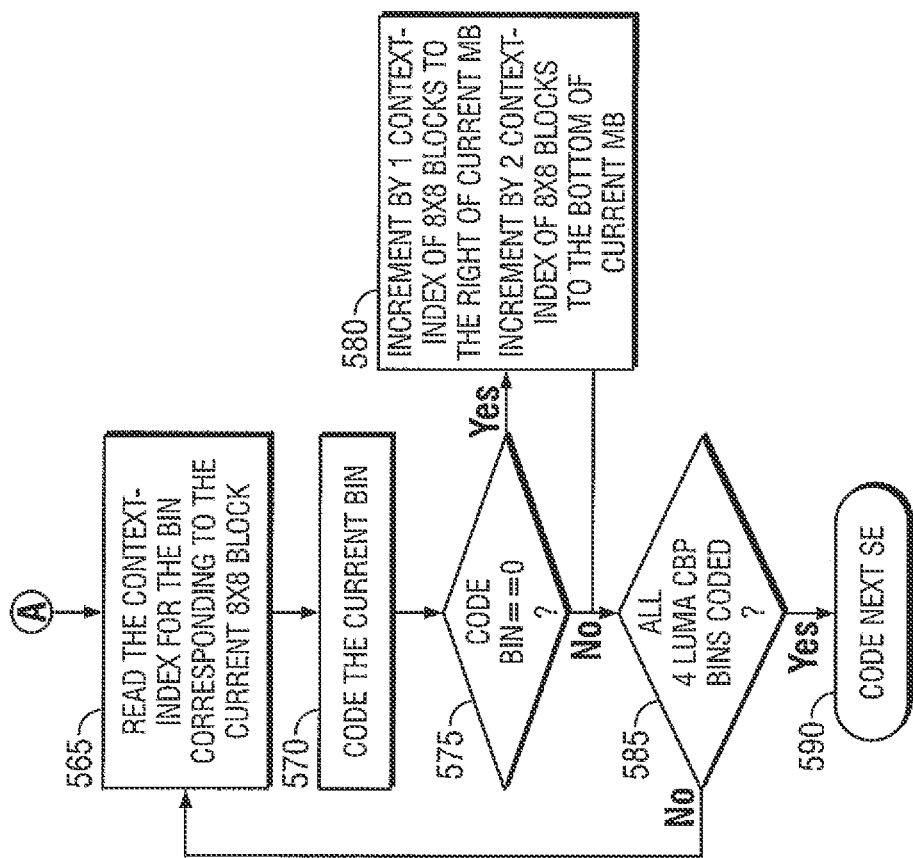

FIG. 5 is flowchart showing one example of the steps involved in the derivation of the context-indices using the broadcasting method. Preliminarily, two rows of the context index are initialized to the first context index value (i.e., 73). The luma CBP bin of block C is coded using the initialized or updated value of the context-index. Based on the coded bin value and the characteristics of block C, the context-index of the corresponding bin in neighboring blocks D and E are updated if they are different from the initialized value.

The process begins at step 505 when a context-index-offset is initialized. Specifically, two rows of context-index values are initialized, which correspond to 4 bins of the luma CBP. This step may be performed a single time for all the macroblocks in the row. Next, at step 510, if the current MB is I-PCM, then as indicated at steps 515 and 530, respectively, no changes are made to the context-indexes of the neighboring MBs and the CBP is not coded. At this point the coding of the next syntax element is performed, as indicated at step 535.

If, on the other hand, at step 520 the current MB is not I-PCM, but is a Skip MB, the context-index is incremented by 1 for the right neighboring MBs and by 2 for bottom neighboring MBs in step 525. If the current MB is not I-PCM nor a skip MB, the process continues to step 540. If at step 540 the current MB is an Intra_16×16 MB and if at step 545 the CBP bin value is equal to 0, the context-index is incremented by 1 for right neighboring MBs and by 2 for bottom neighboring MBs at step 550. The process then continues with the coding of the next syntax element at step 560.

Returning to step 540, if the current MB is not an Intra_16×16 MB, then the process proceeds to step 565, where the context-index for the bin corresponding to the current block, regardless of type (excepting I-PCM, skip and Intra_16×16 blocks), is read and subsequently coded in step 570. If the coded bin value is determined to be equal to 0 at step 575, then at step 580 the context-index is incremented by 1 for the right neighboring MB and by 2 for bottom neighboring MB. At step 585 it is determined if all 4 luma CBP bins are coded. If not, then the process returns to step 565 for the remaining luma CBP bins Once all 4 luma CBP bins of the current MB are coded, the process begins to code the next syntax element at step 590.

Since in the above process the CBP is only coded for the MBs which are not I_PCM or P_SKIP or B_SKIP, the checks for mb_type of the neighboring blocks for context-index calculation as used with direct method is completely eliminated.

Context-indexes at blocks E and D are now readily available. As soon as the bin values for samples D and E are available, subsequent context-indexes 'fanned-out' by blocks D and E can be updated.

The computational requirements for determining the context index for coding each bin is as follows. The computation complexity reduces to 1 conditional check (as indicated in steps 525 and 550) and up to 2 write operations (as indicated in steps 525 and 550. Note that 2 write operations is the worst-case. A write operation is performed only if the context is different from the initialization value. The initialization works well statistically, reducing the number of writes, as explained later. The computation complexity will be the same regardless of whether the neighboring block belongs to same MB or a different MB.

The above computational data requirements may be extrapolated to each frame of 1080p content as follows. For 32,400 bins of luma CBP that are coded, the computations needed for context index determination will be: 32,400 checks, 6,480 write operations (for a typical high bit-rate content) or 16,200 write operations (for a typical low bit-rate content). Table 1 compares the computational data requirements between the conventional direct method and the broadcasting method for context determination in accordance with the subject matter disclosed herein for each frame of 1080p content.

TABLE 1

| For each frame of 1080p | Direct method | Broadcasting method |
| --- | --- | --- |
| Reads | 97,200 | 0 |
| Checks | 1,94,400 | 32,400 |
| Writes | 32,400 | 6,480 Writes (for typical high bit-rate content) or 16,200 Writes (for typical low bit-rate content) |

The number of write operations for typical high bit-rate and low bit-rate content as indicated above have been based on the distribution of 1s and 0s found in luma CBP for typical 1080p content.

Further Reductions in Computational Complexity when Coding the Syntax Element Luma CBP As explained below, further reductions in the computational complexity while decoding luma CBP can be achieved based on bit rate. It has been observed that for high bit-rate streams, CBP bins with is are relatively high. Conversely, for low bit-rate streams, CBP bins with 0s are relatively high. As examples, consider two conformance streams of the H.264 Standards Committee with QCIF resolution (176×144). Specifically, for the low bit-rate stream, consider CABACI3_Sony_B: (189 kbps). For this stream the number of ones in the luma CBP is 23107 and the number of zeros in the luma CBP is 72661. For the high bit-rate stream, consider CABA1_Sony_D: (758 kbps). For this stream the number of ones in the luma CBP is 17735 and the number of zeros in the luma CBP is 2065.

As described above, the broadcasting method has the context-indexes initialized to the first of the set of context-indexes available for each syntax element. The updates to context-indexes occur when the increment to the context-index is non-zero, which in turn happens when the luma CBP bin is 0 under certain conditions for the mb type. This turns out to be advantageous in high bit-rate cases, where the number of 0s in the CBP was found to be relatively few. For instance, out of a total of 19800 luma CBP bins for the CABA1_Sony_D stream, only 4130 updates to context-indexes are required, which accounts for 10.4% of the worst case number of write operations for the broadcasting method.

Using a similar approach for low bit-rate streams provides guidance for changing the initialization and update schemes as follows. If there are a relatively few number of ones in the CBP (as in the case of very low bit-rate content), the context-indexes are initialized to the highest possible context-index available for each syntax element. In addition, the context-index is decremented when the CBP is 1 under certain conditions for the mb type. This turns out to be advantageous for low bit-rate cases, where the number of is in the CBP was found to be relatively few. For instance, out of a total of 95768 luma CBP bins for the CABACI3_Sony_B stream, only 46214 updates to context-indexes are required, which accounts for 24% of the worst case number of write operations.

The two cases may be summarized as follows for the example of the luma CBP syntax element.

Case 1: Context-index is incremented (Favors a high number of 1s)
  a. Initialize the context-index to the first context (e.g., 73 for the luma CBP) in the available set of context-indexes for that syntax element.
  b. For every CBP bin being decoded as a zero, or if the current block belongs to a skipped macroblock, increment the context-index of the neighboring blocks, resulting in a write operation in such cases (increment by 1 for right neighbor or by 2 for the bottom neighbor for CBP).

For high bit-rate streams, CBP bins having is are high, in which case fewer write operations/increments will be incurred.

Case 2: Context-index is decremented (Favors a high number of 0s)
  a. Initialize the context-index to the last context (e.g. 76 for Luma CBP) in the available set of context-indexes for that syntax element.
  b. For every CBP bin being decoded as a one, or if the current block belongs to a PCM MB, decrement the context-index of the neighboring blocks, resulting in a write operation in such cases (decrement by 1 for right neighbor or by 2 for bottom neighbor for CBP).

Table 2 below summarizes the updates made to neighbors based on the coded bin and mb_type of the coded block. Increments and decrements are by 1 for right neighboring MBs and by 2 for bottom neighboring MBs.

TABLE 2

| mb_type and cbp_bin of coded block | | Case1: update to neighbor | Case2: update to neighbor |
|---|---|---|---|
| I_PCM | | No change | Decrement |
| P_Skip or B_Skip | | Increment | No change |
| other mb_type and | cbp bin | Increment | No change |
|  | cbp bin | No change | Decrement |

Next, consider two conformance streams from the H.264 Standards Committee with QCIF resolution. Specifically, for high bit-rate content consider a CABA1_Sony_D (758 kbps) stream, in which the distribution of MBs based on mb_types (pcm, skip, and others) present in the content is as follows: zero PCM mbs, zero skip mbs: 0 and 4950 other mbs. Luma CBP bin values are distributed as follows: 17735 ones and 2065 zeros.

Table 3 shows the computations requirements based on the distribution of the MBs and CBP bins.

TABLE 3

| mb_type and cbp_bin of coded block | | Case1: number of increments | Case2: number of decrements |
|---|---|---|---|
| I_PCM | | 0 | 0 |
| P_Skip or B_Skip | | 0 | 0 |
| other mb_type and | cbp bin | 4,130 | 0 |
|  | cbp bin | 0 | 35,470 |

Using Case 1 with high bit rate content, a savings of about 88% in the number of computation cycles may be achieved when updating the context-index in comparison to Case 2. So Case 1 favors high bit-rate content since the number of CBP bins which have a value of one is more than the number CBP bins which have a value of zero.

Next, for low bit-rate content, consider a CABACI3_Sony_B (189 kbps) stream for which the distribution of MBs based on mb_types is as follows: 0 PCM MBs, 5758 skip MBs and 23942 other MBs. Luma CBP bin values are distributed as follows: 23107 ones and 72661 zeros.

Based on the distribution of the MBs and CBP bins, the computational needs are shown in Table 4.

TABLE 4

| mb_type and cbp_bin of coded block | | Case1: number of increments | Case2: number of decrements |
|---|---|---|---|
| I_PCM | | 0 | 0 |
| P_Skip or B_Skip | | 1,38,192 | 0 |
| other mb_type and | cbp bin | 1,45,322 | 0 |
|  | cbp bin | 0 | 46,214 |

Using Case 2 with low bit rate content, a savings of about 83.7% is achieved in the number of computation cycles when updating the context-index in comparison to Case 1. So Case 2 favors low bit-rate content since the number of CBP bins which have a value of zero are more than the number of CBP bins which have a value of one.

The above analysis suggests the use of the following approach for updating the context index. First, check the bit-rate of the stream. Next, select Case 1 or Case 2 based on the predicted relative number of 1s and 0s in the bins of the syntax element, such that fewer write operations are incurred using the selected approach. For example, fewer write operations are incurred when there are more 1s in the CBP by using Case 1 described above.

The conventional direct method and the broadcasting method are compared in Tables 5 and 6 by roughly comparing the computational needs for the QCIF streams.

TABLE 5

| High bit-rate content: (CABA1_Sony_D) | Direct | Case1 (increment) | Case2 (decrement) |
|---|---|---|---|
| Reads | 55452 | | |
| Checks | 110904 | 19800 | 19800 |
| Increments/Decrements | 4130 | 4130 | 35470 |
| Writes (store) | 18484 | 4130 | 35470 |
| Total computations | 188970 | 28060 | 90740 |
| Operational savings compared to direct method | | 85.15% | 51.98% |

TABLE 6

| Low bit-rate content: (CABACI3_Sony_B) | Direct | Case1 | Case2 |
|---|---|---|---|
| Reads | 564048 | | |
| Checks | 494952 | 95768 | 95768 |
| Increments/decrements | 227726 | 283514 | 46214 |
| Writes (store) | 94008 | 283514 | 46214 |
| Total computations | 1380734 | 662796 | 188196 |
| Operational savings compared to direct method | | 51.99% | 86.36% |

Having presented the decoding of the luma CBP as one example to which the broadcasting method may be employed, the decoding of another illustrative syntax element in H.264 will next be considered, specifically mb_qp_delta.

Example—Decoding the First Bin of Syntax Element Mb_Qp_Delta

The value of the luma quantization parameter (QPy) used for coding residual data is sent in the slice header. The syntax element mb_qp_delta is used to signal any changes to this parameter at the MB layer. The syntax element mb_qp_delta is not sent for the macroblocks of type I_PCM, Skip, and for Intra16×16 having a CBP value of zero. For all the other MBs this syntax element is sent.

H.264 specifies two different contexts for decoding the first bin of the mb_qp_delta syntax element. The specific context is selected based on the information from the neighboring macroblock. The neighboring MB is the block previous in the coding order to the current block.

The computational needs for determining the context-index used for decoding the first bin (bin_0) of mb_qp_delta will be examined below. The computational needs for both the direct coding method and the broadcast coding method will be compared.

The following steps are performed to derive the context-index using the direct method. First, in step 1, the context-index is initialized to Context-Index-Offset. In step 2, the syntax elements mb_qp_delta are not sent for the macroblocks of type I_PCM and Skip and for non Intra16×16 macroblock having a CBP value of zero. Rather, the process goes to step 9, discussed below. In step 3, the syntax element is sent for all the other macroblocks not specified in step 2. The syntax elements CBP, mb_type, mb_qp_delta of the previous MB (i.e., previous in the coding order) are then read in step 4. The following conditional checks are performed in step 5 on the values read from the previous MB:
  a. Check if neighboring MB's mb_type=I_PCM or P_Skip or B_Skip;
  b. Check if neighboring MB's mb_type !=Intra_16×16 and CBP=0;
  c. If any of the above conditions are true, go to step 7 for coding the bin;
  d. Check if neighboring MB's mb_qp_delta=0 and if so go to step 7 for coding the bin.

Otherwise, in step 6, increment the context-index by 1. In step 7 the context associated with the updated context-index is used for coding the first bin of mb_qp_delta. The other bins are coded and the coded mb_qp_delta value is stored in step 8. Finally, the next next syntax element is coded in step 9.

Thus, when decoding the first bin of mb_qp_delta, 3 read operations are performed (as indicated in step 4), up to 6 conditional checks are performed (as indicated in step 5.a, 5.b and 5.d,) and 1 write operation is performed (as indicated in step 8).

Figure 6:
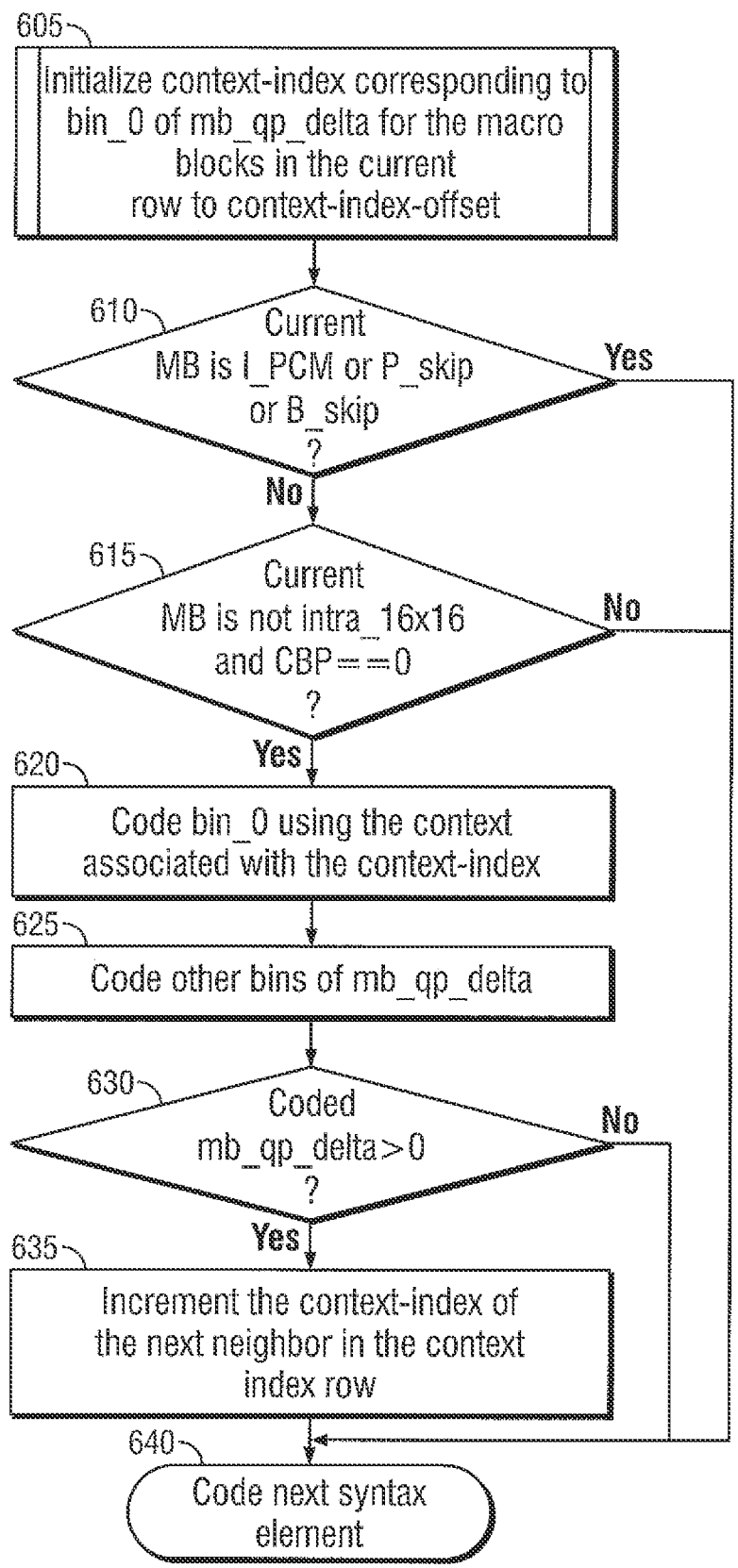
FIG. 6 is a flowchart showing one example of a process that may be performed to derive the context-index using the broadcasting method.

Extrapolating the computational needs for a frame of 1080p content, with each frame having 8100 macroblocks, there will be 24,300 read operations, up to 48,600 checks and 8,100 write operations FIG. 6 is a flowchart showing one example of a process that may be performed to derive the context-index using the broadcasting method described herein. First, at step 605 a row of context indices are initialized to a default value (the context-index-offset). The context-indices that are initialized are those which correspond to the first bin (bin_0) of mb_qp_delta for all macroblocks in the row. Next, if the current MB is of type I_PCM or Skip at step 610, the syntax element mb_qp_delta is not sent and the process proceeds to step 640, where the next syntax element is coded. If on the other hand the current MB is not of type I_PCM or Skip at step 610, the process proceeds to step 615, if the current MB if of type Intra_16×16 and the CBP is equal to zero. If not, then once again the syntax element mb_qp_delta is not sent and the process proceeds to step 640, where the next syntax element is coded.

If at step 615 it is determined that the current MB if of type Intra16×16 and the CBP is equal to zero, then at step 620 the first bin (bin_0) of mb_qp_delta is coded using the context associated with the initialized or updated context-index. Next, at step 625 all the other bins of mb_qp_delta are coded. The process continues to step 630, where it is determined if mb_qp_delta has a value greater than 0. If so, then at step 635 the context-index of the next MB in the coding order is incremented by 1, after which the process begins to code the next syntax element in step 640.

Since the syntax element mb_qp_delta is not sent for the macroblocks of type I_PCM, Skip, and Intra16×16 MBs having a CBP value of zero, read operations and conditional checks of mb_type and the CBP of the neighboring MB are eliminated using the broadcasting method.

The computational needs for decoding the first bin of mb_qp_delta involve 1 conditional check (as indicated in step 630) and up to 1 write operation (as indicated in step 635) Extrapolating these computational needs for a frame of 1080p content, with each frame having 8100 macroblocks, yields 8100 checks and up to 8100 write operations.

Table 7 compares the computational data requirements between the direct method and the broadcasting method for each frame of 1080p content.

TABLE 7

| for each frame of 1080p | Direct method | Broadcasting method |
| --- | --- | --- |
| Reads | 24,300 | 0 |
| Checks | 48,600 | 8,100 |
| Writes | 8,100 | 8,100 |

Figure 7:
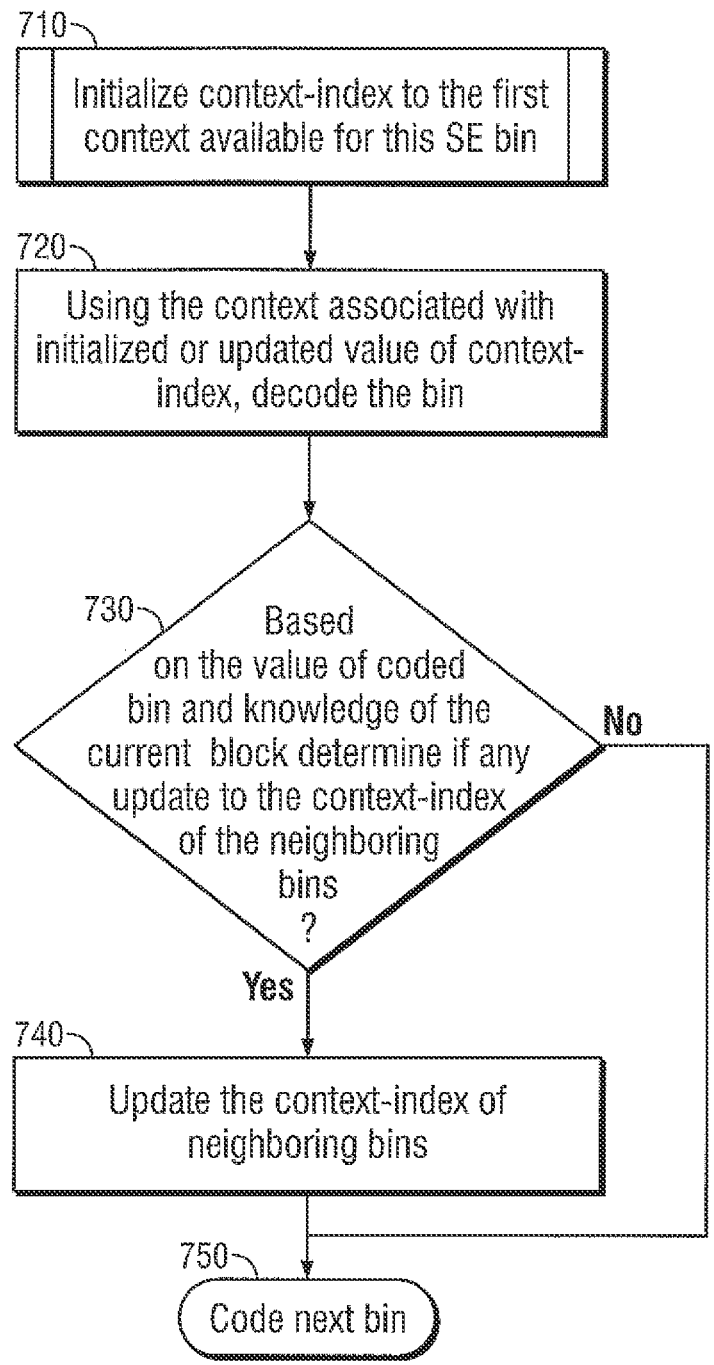
FIG. 7 is a flowchart illustrating one example of a process that may be performed to derive the context-index of all applicable syntax elements using the broadcasting method.

The example of the CBP presented above can be generalized to all applicable syntax elements. FIG. 7 is a flowchart illustrating one example of this process. First, in step 710 the context-index is initialized to the first context available for this syntax element bin. Next, in step 720 the context associated with the initialized or updated value of context index is used to decode the bin. Based on the value of the decoded bin and knowledge of the current block, determine in decision step 730 if any update to the context index of the neighboring bins is needed. If yes, then the process proceeds to step 740 in which the context index of the neighboring bins is updated. If no, the process continues to step 750 in which the next bin is decoded.

By eliminating the need to access information from the neighboring MBs for determining the context, the techniques described herein achieve a significant time savings by reducing the number of read operations, conditional checks and write cycles.

The context-index values for the bin of neighboring MBs (e.g., the right and bottom neighbors in some cases and the next neighbor in other cases) are updated after decoding the bin in the current block. An optimal design for storing and updating these context indices would be to maintain two rows (when updating two neighboring MB) or one row (when updating only one neighbor MB) of context-index values corresponding to the bins of the current and next row of macroblocks. The elements in the current row and the following row are initialized to a default value (e.g., the context-index associated with the first context available for the syntax element) and updated as and when needed. At the end of the current row of MBs, the next row becomes the current row and the previous current row becomes the next row, and the next row is then re-initialized to the default value.

De-Binarization

As previously discussed, all syntax elements, including those that have non-binary values, are first represented in binary as a sequence of bins before CABAC encoding is performed. This is process is known as binarization. There are four basic types of binarization schemes that are used in H.264 and HEVC: the unary code, the truncated unary code, the kth order Exp-Golomb code, and the fixed-length code. In some cases concatenated codes using these basic types have been used. Some syntax elements have codes that are pre-defined in the standard. The mb_type (I, P, B) and sub_mb_type syntax elements, for instance, fall in this category.

At the decoder, the bins are decoded in the order in which they arrive and the received bins are de-binarized. For each syntax element, a string of decoded bins is maintained. After decoding each bin of the syntax element, the bin string for the current syntax element being decoded is updated. Once a valid syntax element has been received, the process of de-binarization for the current syntax element is terminated and one for the next syntax element is initiated. The process of terminating the de-binarization process depends on the binarization scheme that is used. For example, if a unary code has been used for a given syntax element, the de-binarization process is terminated once a 0 has been received. For syntax elements like mb-type and sub-mb_type, the standards define a table of all possible values of the syntax element. After decoding each bin value in a bin string, the de-binarization procedure defined in the standard and in legacy implementations compares the partially decoded bin string against all the entries in the table.

One aspect of the subject matter disclosed herein relates to a more optimal method for de-binarization of these tabulated codes for syntax elements such as mb_type and sub_mb_type. The following example will consider de-binarization of the I mb_types. Table 8, which is defined in the H.264 standard, shows the bin string that corresponds to various I mb_types. In the conventional method described above, after each bin is decoded, the resulting bin-string is compared against each of the 25 syntax elements shown in the table. By contrast, the method described herein significantly reduces the number of entries in the table that need to be searched.

In accordance with the method, the number of bins in each valid syntax element is noted. As can be seen from Table 8, there are have 1-bit, 2 bit, 6-bit and 7-bit bin strings for the I mb_types syntax elements. Next, the table is re-arranged so as to arrange all bin strings with an equal number of bits in a consecutive manner. Table 9 shows the re-arranged entries in our invention where all the mb_types having equal number of bins are grouped together. In this example the entries are ordered from the bin strings with the least number of bits to maximum number of bits.

After decoding of each bin in a bin string, the number of bins in the updated bin string is checked to see if can result in a valid syntax element. If so, only those entries in the table that contain the given number of bins are searched. Hence, in this example, after the first bin is decoded, the bin string is checked to see if its value is "0". If not, the next bin in the bin string is decoded. Once again, the updated bin string is compared to those entries in Table 9 which have the given number of bins in the updated bin string to check if the bin string matches the second entry in the table which is "1,1". After this step 4 more bins are decoded. At this point the binary string is matched against table entries 3-10 only. If at this point there is still no matching entry the last bin is decoded and matched against entries 11-25. At any point when a valid syntax element is found the decoding process for that syntax element is terminated.

Figure 8:
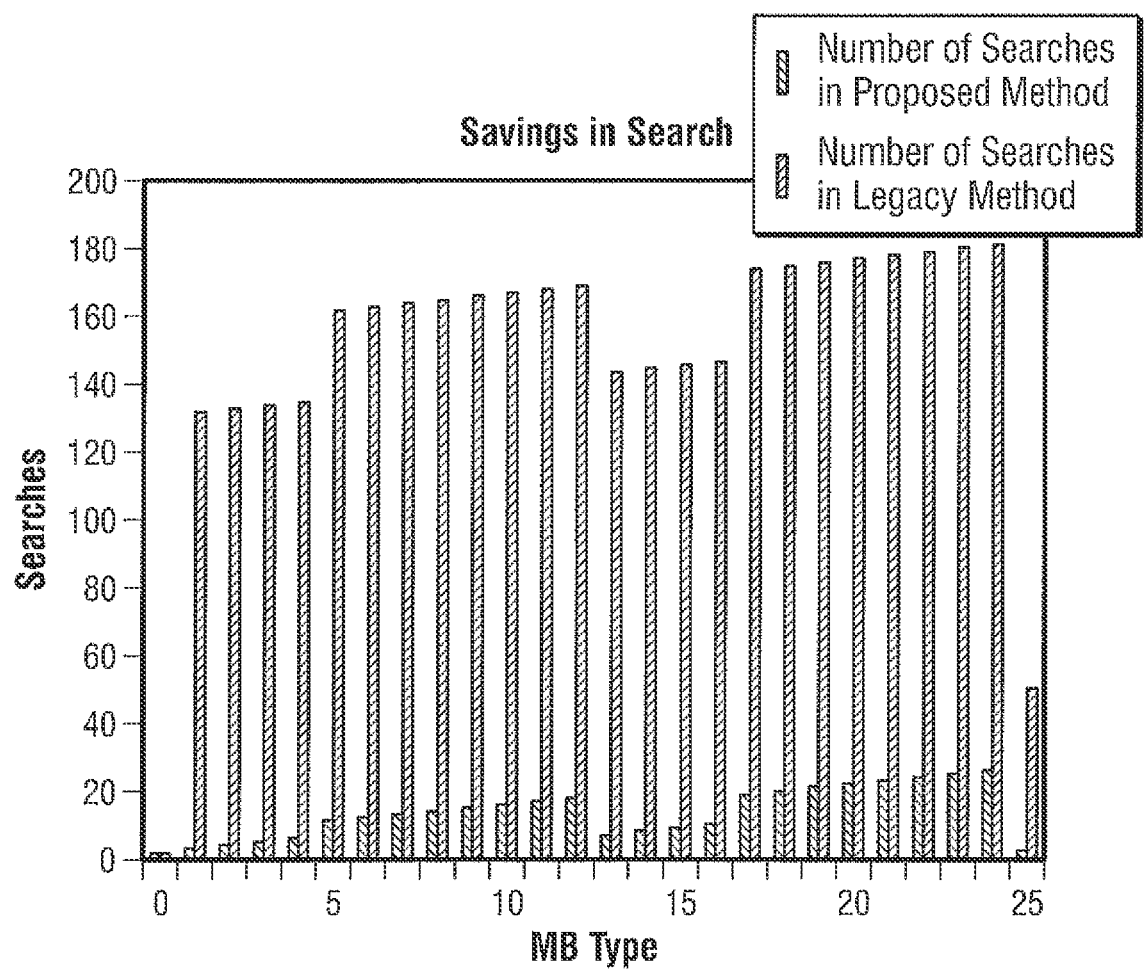
FIG. 8 is chart comparing the number of searches performed for de-binarizing each mb_type using a legacy method and the method described herein.

In has been demonstrated that up to a 75% savings in the time required for de-binarization can be achieved when the syntax element mb_type is de-binarized using the technique described herein. A comparison of the number of searches performed for de-binarizing each mb_type using the legacy method and the method described herein is shown in FIG. 8.

TABLE 8

| | | Value | Name of MB_TYPE | Binary Code | | | |
|---|---|---|---|---|---|---|---|
| | | 0 | (I_NxN) | 0 | | | |
| 0 | 0 | 1 | (I_16x16_0_0_0) | 1 | 0 | 0 | 0 |
| 0 | 1 | 2 | (I_16x16_1_0_0) | 1 | 0 | 0 | 0 |
| 1 | 0 | 3 | (I_16x16_2_0_0) | 1 | 0 | 0 | 0 |
| 1 | 1 | 4 | (I_16x16_3_0_0) | 1 | 0 | 0 | 0 |
| 0 | 0 0 | 5 | (I_16x16_0_1_0) | 1 | 0 | 0 | 1 |
| 0 | 0 1 | 6 | (I_16x16_1_1_0) | 1 | 0 | 0 | 1 |
| 0 | 1 0 | 7 | (I_16x16_2_1_0) | 1 | 0 | 0 | 1 |
| 0 | 1 1 | 8 | (I_16x16_3_1_0) | 1 | 0 | 0 | 1 |
| 1 | 0 0 | 9 | (I_16x16_0_2_0) | 1 | 0 | 0 | 1 |
| 1 | 0 1 | 10 | (I_16x16_1_2_0) | 1 | 0 | 0 | 1 |
| 1 | 1 0 | 11 | (I_16x16_2_2_0) | 1 | 0 | 0 | 1 |
| 1 | 1 1 | 12 | (I_16x16_3_2_0) | 1 | 0 | 0 | 1 |
| 0 0 | 0 | 13 | (I_16x16_0_0_1) | 1 | 0 | 1 | 0 |
| 0 | 1 | 14 | (I_16x16_1_0_1) | 1 | 0 | 1 | 0 |
| 1 | 0 | 15 | (I_16x16_2_0_1) | 1 | 0 | 1 | 0 |
| 1 | 1 | 16 | (I_16x16_3_0_1) | 1 | 0 | 1 | 0 |
| 0 0 | 0 | 17 | (I_16x16_0_1_1) | 1 | 0 | 1 | 1 |
| 0 | 1 | 18 | (I_16x16_1_1_1) | 1 | 0 | 1 | 1 |
| 0 | 1 0 | 19 | (I_16x16_2_1_1) | 1 | 0 | 1 | 1 |
| 0 | 1 1 | 20 | (I_16x16_3_1_1) | 1 | 0 | 1 | 1 |
| 1 | 0 0 | 21 | (I_16x16_0_2_1) | 1 | 0 | 1 | 1 |
| 1 | 0 1 | 22 | (I_16x16_1_2_1) | 1 | 0 | 1 | 1 |
| 1 | 1 0 | 23 | (I_16x16_2_2_1) | 1 | 0 | 1 | 1 |
| 1 | 1 1 | 24 | (I_16x16_3_2_1) | 1 | 0 | 1 | 1 |
| | | 25 | (I_PCM) | 1 | | | |

TABLE 9

| Value | Name of MB_TYPE | Binary Code | | | | | |
|---|---|---|---|---|---|---|---|
| 0 | (I_NxN) | 0 | | | | | |
| 25 | (I_PCM) | 1 | 1 | | | | |
| 1 | (I_16x16_0_0_0) | 1 | 0 | 0 | 0 | 0 | 0 |
| 2 | (I_16x16_1_0_0) | 1 | 0 | 0 | 0 | 0 | 1 |
| 3 | (I_16x16_2_0_0) | 1 | 0 | 0 | 0 | 1 | 0 |
| 4 | (I_16x16_3_0_0) | 1 | 0 | 0 | 0 | 1 | 1 |
| 13 | (I_16x16_0_0_1) | 1 | 0 | 1 | 0 | 0 | 0 |
| 14 | (I_16x16_1_0_1) | 1 | 0 | 1 | 0 | 0 | 1 |
| 15 | (I_16x16_2_0_1) | 1 | 0 | 1 | 0 | 1 | 0 |
| 16 | (I_16x16_3_0_1) | 1 | 0 | 1 | 0 | 1 | 1 |
| 5 | (I_16x16_0_1_0) | 1 | 0 | 0 | 1 | 0 | 0 |
| 6 | (I_16x16_1_1_0) | 1 | 0 | 0 | 1 | 0 | 1 |
| 7 | (I_16x16_2_1_0) | 1 | 0 | 0 | 1 | 1 | 0 |
| 8 | (I_16x16_3_1_0) | 1 | 0 | 0 | 1 | 1 | 1 |
| 9 | (I_16x16_0_2_0) | 1 | 0 | 0 | 1 | 0 | 0 |
| 10 | (I_16x16_1_2_0) | 1 | 0 | 0 | 1 | 0 | 1 |
| 11 | (I_16x16_2_2_0) | 1 | 0 | 0 | 1 | 1 | 0 |
| 12 | (I_16x16_3_2_0) | 1 | 0 | 0 | 1 | 1 | 1 |
| 17 | (I_16x16_0_1_1) | 1 | 0 | 1 | 1 | 0 | 0 |
| 18 | (I_16x16_1_1_1) | 1 | 0 | 1 | 1 | 0 | 1 |
| 19 | (I_16x16_2_1_1) | 1 | 0 | 1 | 1 | 1 | 0 |
| 20 | (I_16x16_3_1_1) | 1 | 0 | 1 | 1 | 1 | 1 |
| 21 | (I_16x16_0_2_1) | 1 | 0 | 1 | 1 | 0 | 0 |
| 22 | (I_16x16_1_2_1) | 1 | 0 | 1 | 1 | 0 | 1 |
| 23 | (I_16x16_2_2_1) | 1 | 0 | 1 | 1 | 1 | 0 |
| 24 | (I_16x16_3_2_1) | 1 | 0 | 1 | 1 | 1 | 1 |

The invention claimed is:

1. A method of determining a context-index when performing Context-based Adaptive Binary Arithmetic Coding (CABAC) for video compression or decompression, the method comprising:
    initializing to an initialized value each of a plurality of context-indexes of chosen syntax elements associated with given blocks, the given blocks including at least two next rows of blocks to be coded;
    evaluating the context-index of dependent neighboring blocks of a first block in the given blocks prior to coding or decoding of the neighboring blocks, the dependent neighboring blocks being blocks that have a context-index that depends on the coding of a current bin position within the first block; and
    updating the context-index of the dependent neighboring blocks from the initialized values which coding or decoding the first block and prior to coding or decoding of the dependent neighboring blocks.

2. The method of claim 1, wherein the selected syntax elements are specified in an H.264/MPEG 4 AVC standard and are selected from the group consisting of a mb_type, mb_skip_flag, transform_size_8x8_flag, mb_qp_delta, mb_field_decoding_flag, intra_chroma_pred_mode, mvd (horizontal)_l0, mvd (vertical)_l0, mvd (horizontal)_l1, mvd (vertical)_l1, ref_idx_l0 and ref_idx_l1, coded_block_pattern and coded_block_flag.

3. The method of claim 1, wherein the selected syntax elements are specified in a HEVC standard and are selected from the group consisting of a split_cu_flag, cu_skip_flag, sig_coeff_flag if the video compression or decompression performed using HEVC.

4. The method of claim 1, wherein the context-index of the dependent neighboring blocks only depends on the coding of the current bin position within the given blocks when at least one specified condition is satisfied, one of the specified conditions being dependent on the block type.

5. The method of claim 1, wherein initializing the plurality of context-indexes includes selectively initializing all context-indexes to a minimum possible context-index for the selected syntax element being coded or decoded or to a maximum possible context-index for the selected syntax element being coded or decoded.

6. The method of claim 5, wherein initializing and updating the context-index of the dependent neighboring blocks includes incrementing the context-index based on block type and a bit rate of a video stream being compressed or decompressed.

7. The method of claim 5, wherein initializing and updating the context-index of the dependent neighboring blocks includes decrementing the context-index based on block type and a bit rate of a video stream being compressed or decompressed.

8. The method of claim 1, wherein initializing the plurality of context indexes includes initializing up to two rows of context index samples.

9. A method of debinarizing Context-based Adaptive Binary Arithmetic Coding (CABAC) data during video compression or decompression, the method comprising:
    identifying all syntax elements in an arrangement, and which are coded with a specific bit pattern and bit length that is pre-defined by a protocol;
    rearranging the codes of the syntax elements that are identified such that the codes with an equal number of bits are arranged sequentially without any intervening codes having a different number of bits; and
    performing de-binarization using the arranged codes of the syntax elements.

10. The method of claim 9, wherein performing the de-binarization comprises:
    checking if a number of decoded bins in a bin string formed during the decoding of one of the syntax elements can result in a valid syntax element;
    if the said number of decoded bins can potentially yield a valid syntax element, searching only those sequentially arranged codes that contain the given number of bins; and
    identifying a valid syntax element that matches the bin string formed during the decoding of the syntax element.

11. The method of claim 9, wherein the protocol conforms to an H.264/MPEG 4 AVC standard.

12. A CABAC included within an encoder or decoder, comprising:
    a binarization module for converting a syntax element into a sequence of bins;
    a context-index module for obtaining one or more context models for the syntax element based on the sequence of bins, each of the context models being associated with a context model, wherein the context-index module obtains the one or more context models by initializing a context-index of the syntax element associated with given blocks including at least one of two next rows of blocks to be coded or decoded and evaluates the context-index of dependent neighboring blocks of a first block in the given blocks prior to coding or decoding of the dependent neighboring blocks, the dependent neighboring blocks being blocks that have a context-index that depends on coding of a current bin position within the first block of the given blocks; and an arithmetic encoder or decoder for updating the one or more context models based on the sequence of bins and using the one or more context models to encode or decode each of the bins in the sequence, wherein the arithmetic encoder updates the one or more context models by updating the associated context-indices of the dependent neighboring blocks while coding or decoding the first block and prior to coding or decoding of the dependent neighboring blocks, when their context-indices changes from the initialized values.

13. The CABAC of claim 12, wherein the context-index module is further configured to assign a context model to each bin the sequence of bins.

14. The CABAC of claim 12, wherein the context-index of the dependent neighboring blocks only depends on the coding of the current bin position within the given blocks when at least one specified condition is satisfied, one of the specified conditions being dependent on the block type.

15. The CABAC of claim 12, wherein the context-index module is further configured to initialize the plurality of context-indexes by selectively initializing all context-indexes to a minimum possible context-index for the selected syntax element being coded.

16. The CABAC of claim 15, wherein the context-index module is further configured to initialize and update the context-index of the dependent neighboring blocks by incrementing the context-index based on macroblock type and a bit rate of a video stream being compressed or decompressed.

17. The CABAC of claim 12, wherein the context-index module is further configured to initialize the plurality of context-indexes by initializing all context-indexes to a maximum possible context-index for the selected syntax element being coded.

18. The CABAC of claim 17, wherein the context-index module is further configured to initialize and update the context-index of the dependent neighboring blocks by decrementing the context-index based on block type and a bit rate of a video stream being compressed or decompressed.

19. The CABAC of claim 12, wherein the context-index module is further configured to initialize the plurality of context indexes by initializing up to two rows of context index samples.

* * * * *